(12) United States Patent
Martinez et al.

(10) Patent No.: US 9,376,080 B1
(45) Date of Patent: Jun. 28, 2016

(54) VEHICLE INTERIOR TRIM PANEL (71) Applicant: Nissan North America, Inc., Franklin, TN (US)

(72) Inventors: Jorge Guadarrama Martinez, Toluca (MX); Masahisa Inoue, Kanagawa (JP); Yousuke Murata, Kanagawa (JP)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 14/675,487

(22) Filed: Mar. 31, 2015

(51) Int. Cl.
*B60R 21/16* (2006.01)
*B60R 21/213* (2011.01)
*B60R 13/02* (2006.01)
*B60N 3/02* (2006.01)

(52) U.S. Cl.
CPC .............. *B60R 21/213* (2013.01); *B60N 3/026* (2013.01); *B60R 13/025* (2013.01); *B60R 2013/0287* (2013.01)

(58) Field of Classification Search
USPC .......... 280/728.2, 728.3, 730.2; 296/1.02, 71, 296/193.06
See application file for complete search history.

(56) References Cited

U.S. PATENT DOCUMENTS

| 5,105,521 | A | 4/1992 | Dowd et al. | |
|---|---|---|---|---|
| 6,955,395 | B2 * | 10/2005 | Oshina | B60R 13/0206 296/214 |
| 7,017,942 | B2 | 3/2006 | Elqadah et al. | |
| 7,793,999 | B2 | 9/2010 | O'Brien et al. | |
| 7,850,197 | B2 | 12/2010 | Zucal et al. | |
| 7,922,189 | B1 | 4/2011 | Dillon et al. | |
| 8,104,813 | B2 | 1/2012 | She | |
| 8,186,709 | B2 | 5/2012 | She | |
| 8,297,645 | B2 | 10/2012 | Thurston et al. | |
| 8,840,136 | B2 | 9/2014 | Masatsugu et al. | |
| 2007/0052220 | A1 * | 3/2007 | Hidaka | B60R 21/213 280/730.2 |
| 2007/0267884 | A1 * | 11/2007 | Failla | B60N 3/026 296/1.02 |
| 2014/0312600 | A1 * | 10/2014 | Verner | B60R 13/025 280/728.2 |

* cited by examiner

*Primary Examiner* — Toan To
(74) *Attorney, Agent, or Firm* — Global IP Counselors, LLP (57) ABSTRACT

A vehicle interior trim panel includes an external layer and a base layer. The external layer defines an aperture, and is configured to overlie a vehicle interior structure and has a portion configured to be disposed in an aperture between the vehicle interior structure and a handle attached to the vehicle interior structure. The base layer is configured to be disposed between the external layer and the vehicle interior structure, without being disposed between the external layer and the vehicle interior structure at the portion of the external layer disposed between the vehicle interior structure and the handle. The base layer includes a peripheral edge spaced from the aperture.

20 Claims, 8 Drawing Sheets

VEHICLE INTERIOR TRIM PANEL

BACKGROUND

1. Field of the Invention

The present invention generally relates to a vehicle interior trim panel. More specifically, the present invention relates to a vehicle interior trim panel that facilitates the deployment of an airbag in the area adjacent an interior handle coupled to the interior structure of the vehicle.

2. Background Information

A vehicle interior trim panel typically attaches to a structural member within a vehicle passenger compartment. For example, an A-pillar trim panel is shaped and configured to attach to and conceal an A-pillar of the vehicle. A-pillars are often provided with a fixedly attached grip assist handle providing passengers with something rigid to hold onto as they enter and exit the vehicle. The trim panel is typically provided with one or more openings such that a portion of the grip assist handle attaches to the pillar and extends through the opening in the trim panel.

Some grip assist handles require a bracket that is fixed to the A-pillar, with the grip assist handle being fixed to the bracket. In such a configuration, the trim panel covers the A-pillar and the bracket. When an airbag is installed beneath a trim panel with an assist grip handle projecting through the trim panel, the trim panel needs to give way without obstruction by the assist grip handle upon deployment of the airbag.

SUMMARY

It has been discovered that to improve deployment of the airbag behind a trim panel in the interior of a vehicle, the trim panel can be modified. In view of the state of the known technology, one aspect is to provide a vehicle interior trim panel comprising an external layer and a base layer. The external layer defines an aperture, and is configured to overlie a vehicle interior structure and has a portion configured to be disposed in an aperture between the vehicle interior structure and a handle attached to the vehicle interior structure. The base layer is configured to be disposed between the external layer and the vehicle interior structure, without being disposed between the external layer and the vehicle interior structure at the portion of the external layer disposed between the vehicle interior structure and the handle. The base layer includes a peripheral edge spaced from the aperture.

Another aspect is to provide a vehicle interior trim panel comprising an external layer and a base layer. The external layer defines an aperture, and is configured to overlie a pillar structure and has a portion configured to be disposed in an aperture between the vehicle interior structure and a handle attached to the vehicle interior structure. The base layer is configured to be disposed between the external layer and the vehicle interior structure. A reduced thickness portion is disposed between the external layer and the vehicle interior structure at the portion of the external layer disposed between the vehicle interior structure and the handle.

Another aspect is to provide a vehicle interior, comprising a pillar structure, a handle and a trim panel. The handle is coupled to the pillar structure, and includes a handle mounting section with a lower mounting surface. The trim panel includes an external layer and a base layer, the external layer defining an aperture, overlying the pillar structure and having a portion disposed between the lower mounting surface and the pillar structure. The base layer is disposed between the external layer and the pillar structure, without being disposed between the external layer and the pillar structure at the portion of the external layer disposed between the pillar structure and the handle. The base layer includes a peripheral edge spaced from the aperture so as not to be pinched by the handle mounting section.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
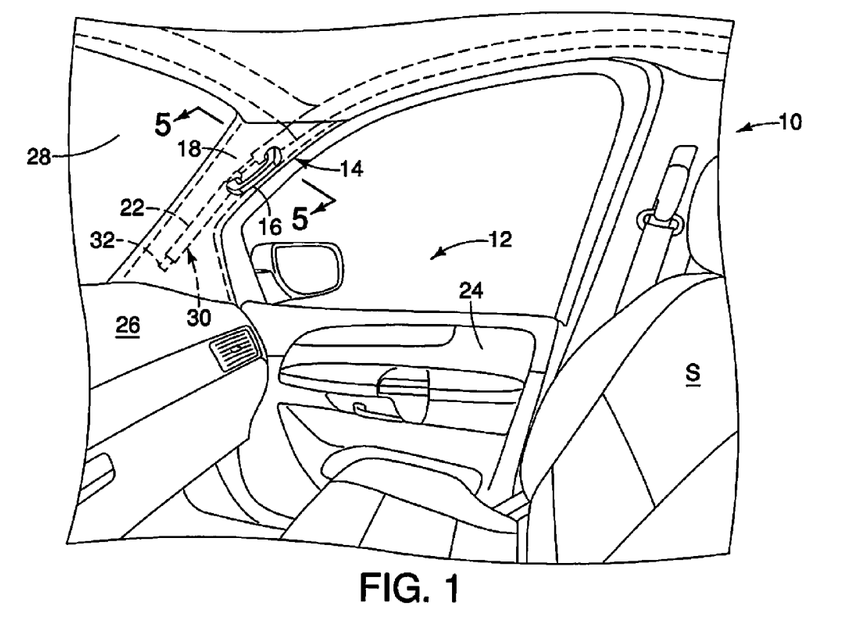
FIG. 1 is a perspective view of a passenger compartment of a vehicle including a vehicle interior having an interior trim panel according to an embodiment of the present invention.
Figure 2:
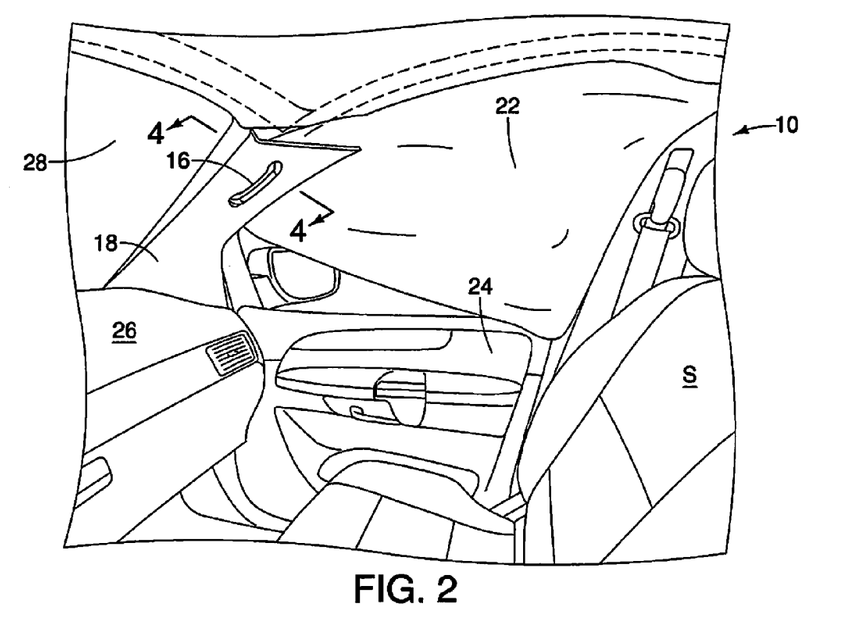
FIG. 2 is a perspective view of the passenger compartment of the vehicle illustrated in FIG. 1 with a supplemental restraint system deployed.
Figure 3:
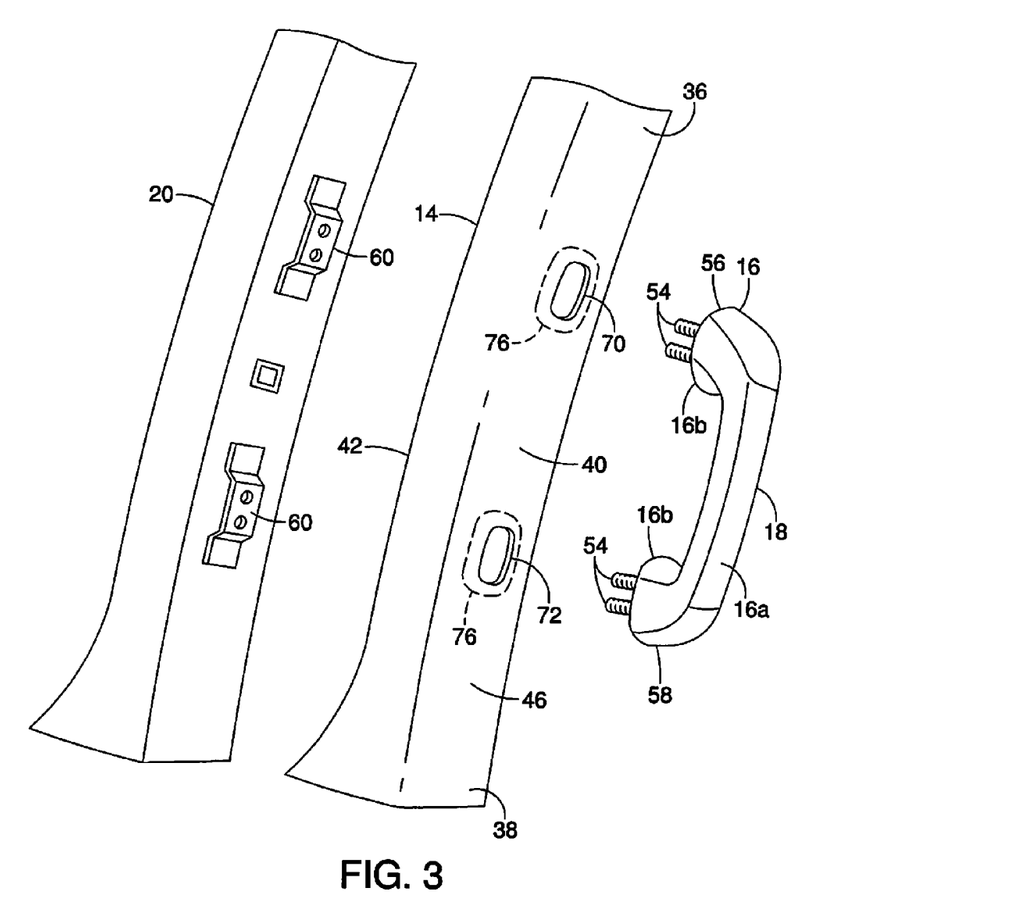
FIG. 3 is an exploded view of the vehicle interior illustrated in FIG. 1.

Referring initially to FIGS. 1-3, an interior 12 of vehicle 10 with a vehicle interior trim panel is illustrated in accordance with a first embodiment. The vehicle interior 12 includes a pillar structure (vehicle interior structure) 20, a trim panel 14 and a handle 16. The handle 16 provides an assist grip 18 that helps passengers get in and out of the vehicle 10. As shown in FIGS. 1 and 3, the pillar structure 20 can be an A-pillar of the vehicle 10. The trim panel 14 is provided with a breakaway feature that allows the trim panel 14 to move away from the pillar structure 20 in response to deployment of a concealed airbag 22, as described in greater detail below.

The vehicle 10 can be a truck, a van, passenger vehicle such as a sedan or coupe or any vehicle that benefits from the inclusion of the handle 16 installed on the pillar structure 20 within the vehicle interior 12 (i.e., the vehicle passenger compartment). As shown in FIGS. 1 and 2, the vehicle 10 includes various conventional elements, such as, for example, a door 24, an instrument panel 26, a windshield 28 and seats S. The vehicle 10 also includes the pillar structure 20, described in greater detail below.

Figure 4:
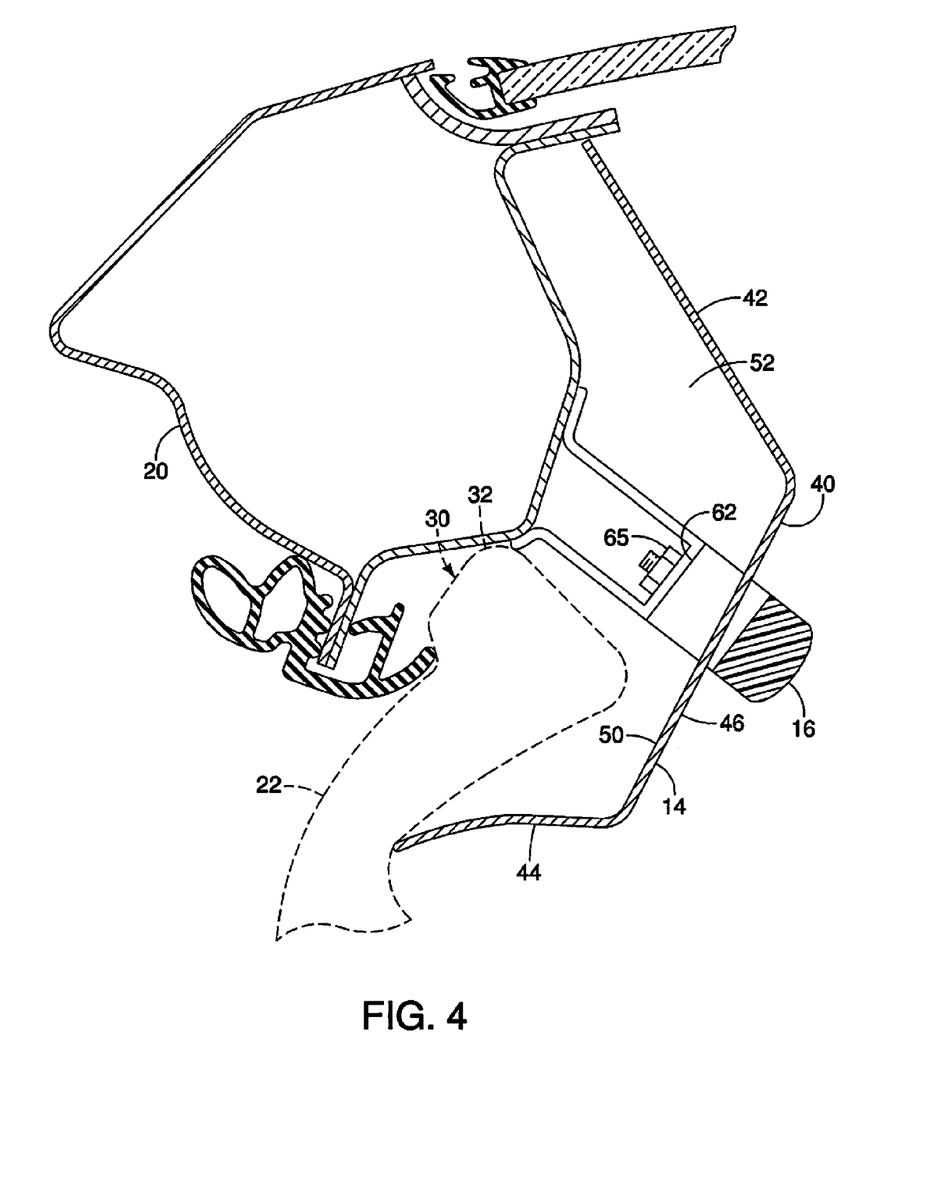
FIG. 4 is cross sectional view of the vehicle interior of FIG. 2 taken along lines 4-4.

As shown in FIGS. 1 and 2, an airbag assembly 30 is attached to the passenger compartment facing surface of the pillar structure 20 and extends upward along the pillar structure 20. The airbag assembly 30 includes an inflation device 32 and the airbag 22. As shown in FIG. 4, the inflation device 32 is attached to the passenger compartment facing surface of the pillar structure 20 via any suitable device, such as fasteners that can be inserted through apertures in the inflation device 32 and further inserted into attachment apertures formed in the pillar structure 20. However, it should be understood that other attachment configurations can be employed for the attachment of the inflation device 32 to the pillar structure 20. For example, rivets, snap-fitting clips, or other mechanical fastening devices can be used.

With the inflation device 32 installed to the pillar structure 20, the airbag assembly 30 is rigidly fixed to and extends along an upper area of the pillar structure and continues along a portion of the roof rail as shown in FIG. 1. A portion of the airbag assembly 30 is rigidly attached to the pillar structure 20 and the roof rail 34 by conventional fasteners, but a remaining portion of the airbag assembly 30 can be retained in a roll or an alternative packing arrangement along the pillar structure 20 and the roof rail 34 by frangible straps, tape, or other attachment members. The trim panel 14 is also configured and arranged such that in response to deployment of the airbag assembly 30, the trim panel 14 separates from the pillar structure 20 by the force of the inflation of the airbag 22. The trim panel 14 then pivots in a manner depicted in FIG. 2, and described below. The pivoting movement of the trim panel 14 allows the airbag 22 to completely inflate and extend downward, covering most, if not all, of the window in the door 24, as is depicted in FIG. 2.

A description of the trim panel 14 is now provided with specific reference to FIGS. 3 and 4. The trim panel 14 is basically a molded member that is made of plastic and/or polymer materials. The trim panel 14 basically includes an upper end 36, a lower end 38, a main portion 40, a first side portion 42 and a second side portion 44. As shown in cross-section in FIG. 4, the main portion 40, the first side portion 42 and the second side portion 44 define a concave surface 50 dimensioned to conceal the airbag 22, with the trim panel 14 installed to the pillar structure. The trim panel 14 also includes an outer surface 46. The handle 16 extends across the outer surface 46.

The main portion 40 extends between the upper end 36 and the lower end 38 but is wider at the lower end 38 of the trim panel 14. The lower end 38 at the main portion 40 can include a pair of snap-fitting projections (not shown) that are positioned to attach the trim panel 14 to the instrument panel 26. The instrument panel 26 can include a pair of corresponding apertures (not shown) that receive the snap-fitting projections thereby retaining the trim panel 14 after installation.

As shown in FIG. 1, the inflation device 32 of the airbag assembly 30 extends toward the lower end 38 of the trim panel 14. The lower end 38 of the trim panel 14 is flush with an upper surface 48 of the instrument panel 26. Therefore, the airbag 22 is completely concealed behind the trim panel 14.

As shown in FIG. 3, the main portion 40, the first side portion 42 and the second side portion 44 cooperate to define an overall U-shape in cross-section in the areas adjacent to the handle 16. The U-shape of the trim panel 14 is provided to cover and conceal the airbag 22. More specifically, the main portion 40, the first side portion 42 and the second side portion 44 define a concave surface 50 which at least partially defines a concave space 52 dimensioned to conceal the airbag 22. Hence, the airbag 22 is concealed between the pillar structure and the trim panel 14 within the concave space 52 defined by the concave surface 50.

As shown in FIG. 4 in cross-section, the main portion 40 of the trim panel 14 also enables the handle 16 to pass therethrough. In other words, the handle 16 is a separate element attached to the pillar structure 20. The handle 16 includes threaded projections 54 at a first end 56 and a second end 58 that extend through the main portion 40 of the trim panel 14 and couple to brackets 60 that are part of to the pillar structure 20. The threaded projections 54 can be bolts that are connected to the brackets 60 using a nut 65 or the threaded projections 54 can be screws or any other suitable connecting structure.

That is, as shown in FIG. 4, the handle 16 is coupled to the pillar structure 20, and includes a handle portion 16a and a handle mounting section 16b with a lower mounting surface 62. The handle 16 can be mounted to the pillar structure 20 by bolts or screws connected to mounted brackets of the A-pillar. The handle 16 can be mounted using 2-4 bolts (or any in other quantity) that bolt to a nut 65.

Figure 5:
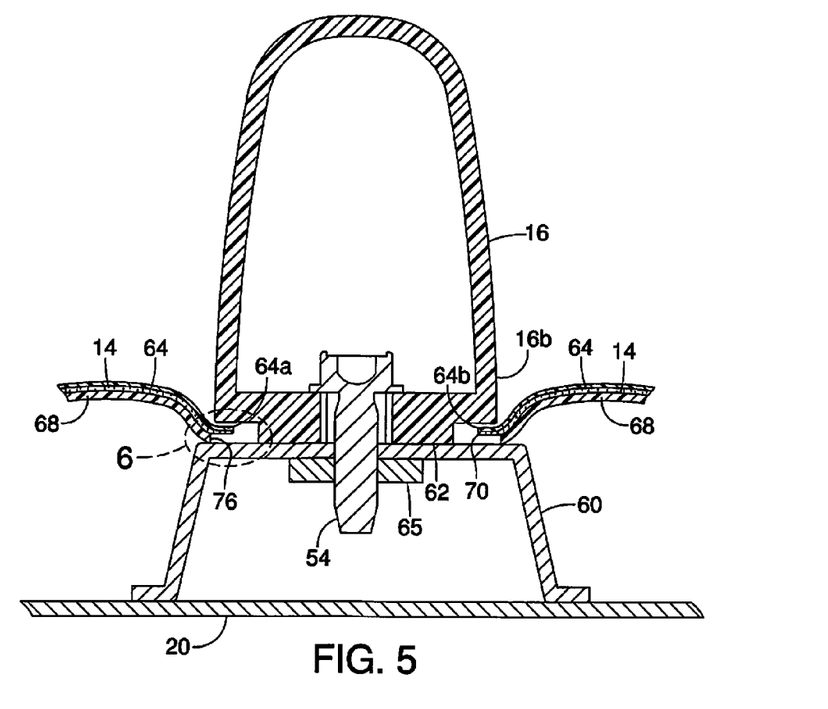
FIG. 5 is a cross sectional view of the vehicle interior of FIG. 1 taken along lines 5-5.
Figure 6:
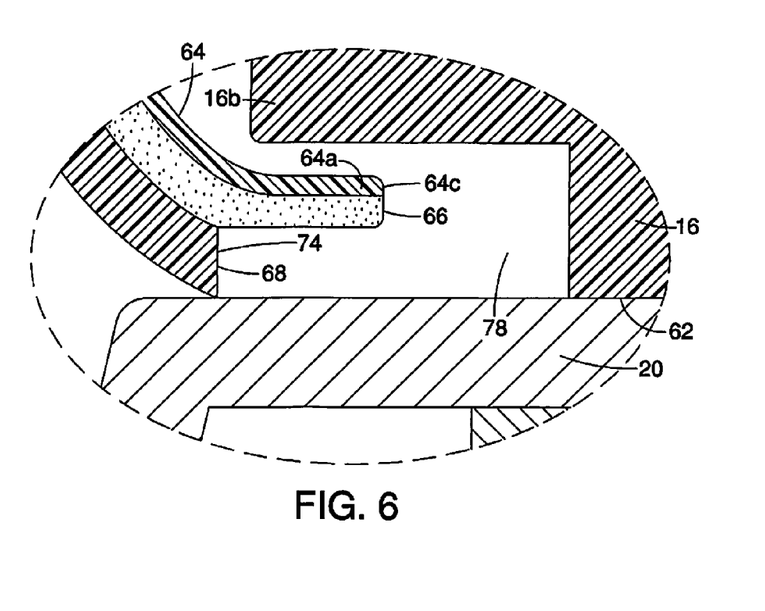
FIG. 6 is an enlarged portion of FIG. 5.

As shown in FIGS. 5 and 6, the trim panel 14 can include an external layer 64, a padding layer 66 and a base layer 68. The external layer 64 is preferably a cloth wrapping and overlies at least a portion of the pillar structure 20; however, the external layer 64 can be any suitable material. The external layer 64 defines at least one aperture that enables the threaded projections 54 from the handle 16 to pass therethrough. In one embodiment, illustrated in FIG. 3, the external layer 64 defines a first aperture 70 and a second aperture 72 that enable the threaded projections 54 from the first end 56 and the second end 58 of the handle 16 to pass through, respectively. The apertures 70 and 72 can be a generally circular opening or any other suitable aperture or opening.

Accordingly, the external layer 64 has a portion disposed between the lower mounting surface 64 of the first and second ends 56 and 58 of the handle 16 and the pillar structure 20. The portion of the external layer 64 configured to be disposed between the pillar structure 20 and the handle 16 is one of a first portion 64a and a second portion 64b of the external layer 64, each of the first and second portions 64a and 64b of the external layer 64 being configured to be disposed between the pillar structure 20 and the handle 16 such that the external layer 64 is disposed between the pillar structure 20 and the handle 16 around an entire base of the handle 16. Each of the first and second portions 64a and 64b can be about 10 mm long; however the first and second portions 64a and 64b can be any suitable length desired. That is, the external layer 64 can be disposed between the pillar structure 20 and the handle in any suitable manner and for any suitable distance.

The base layer 68 can be a plastic material or any other suitable material. The base layer 68 is generally disposed between the external layer 64 and the pillar structure 20, without being disposed between the external layer 64 and the pillar structure 20 at the portion (e.g., the first portion 64a) of the external layer 64 disposed between the pillar structure 20 and the handle 16. That is, the base layer 68 includes a peripheral edge 74 spaced from the aperture 70 so as not to be pinched by the mounting section 16b. In one embodiment, the base layer 68 is disposed between the external layer 64 and the pillar structure 20, without being disposed between the first portion 64a of the external layer 64 and the pillar structure 20 and without being disposed between the second portion 64b of external layer 64 and the pillar structure 20. Thus, the base layer can absent from the area between the pillar section 20 and the handle 16. In one embodiment, this absent area is about 10 mm when measured from the peripheral edge 64c of the external layer 64 to the peripheral edge 74 of the base layer 68.

The absent area of the base layer 68 can generally define a generally circular opening 76 having a radius that is larger (e.g., 10 mm larger) than the aperture 70 of the external layer 64, so as to enable the base layer 68 to be disposed between the external layer 64 and the pillar structure 20, without being disposed between the external layer 64 and the pillar structure 20 at the portion (e.g., the first portion 64a) of the external layer 64 disposed between the pillar structure 20 and the handle 16. This configuration of the trim panel 14 enables the trim panel 14 to be flexible at the portion (e.g., the first portion 64a) of the external layer 64 disposed between the pillar structure 20 and the handle 16 attached to the pillar structure 20 so as to facilitate deployment of the airbag 22.

In one embodiment, the base layer 68 has an area absent such that the base layer 68 is not disposed between the pillar structure 20 and the handle 16. In other words, the base layer 68 is completely outside of the cavity 78 formed between the pillar structure 20 and the handle 16. However, the base layer 68 can be disposed within the cavity 78 formed between the pillar structure 20 and the handle 16. That is, an aperture defined by an opening 76 in the base layer 68 can be formed in any manner such that at least a portion of the base layer 68 has a radius that is larger than the aperture (e.g., aperture 70) defined by the external layer 64 so as to facilitate deployment of the airbag 22.

As illustrated in FIGS. 5 and 6, the padding layer 66 is configured to be disposed between the base layer 68 and the external layer 64. The padding layer 66 can be any suitable material that is flexible and supports the external layer 64 and can extend any suitable distance. The padding layer 66 is disposed between the external layer 64 and the pillar structure 20 at the portion (e.g., the first portion 64a) of the external layer 64 disposed between the pillar structure 20 and the handle 16. However, if desired, the padding layer 66 can be disposed in the same manner as the base layer 68 or in any other suitable manner.

Figure 7:
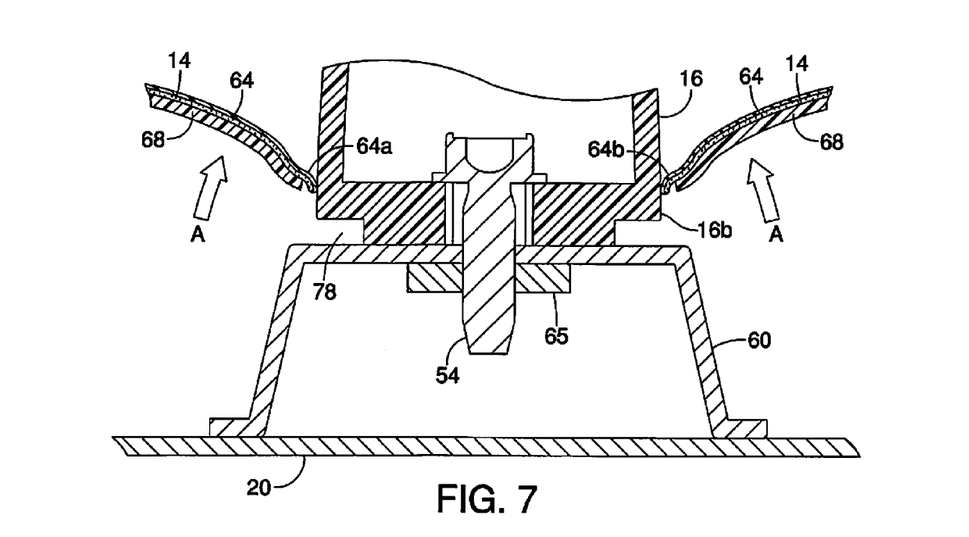
FIG. 7 is a cross sectional view of the vehicle interior shown in FIG. 5 with the supplemental restraint system deployed.

Thus, as shown in FIGS. 2 and 7, the trim panel 14 is configured and arranged such that in response to deployment of the airbag 22, the second side portion 44 moves away from the pillar structure 20 by the force of the inflation of the airbag 22, while the first side portion 42 may remain in contact with the pillar structure 20. The trim panel 12 then pivots in a manner depicted in FIG. 7. That is the trim panel 14 moves away from the pillar structure in the direction of arrows A to enable the air bag 22 to deploy. In this embodiment, the entirety of the trim panel 14 surrounding the base of the handle 16 moves away from the pillar structure 22 such that external layer is no longer disposed in the cavity 78. The pivoting movement of the trim panel 12 allows the airbag 22 to completely inflate and extend downward, covering most, if not all, of the window in the door, as is depicted in FIG. 2.

The first side portion 42 extends along the main portion 40 from the upper end 36 to the lower end 38. The second side portion 44 of the trim panel 14 also extends along the main portion 40 of the trim panel 14 from the upper end 36 to the lower end 38. As shown in FIGS. 5 and 6, the base layer 68 of the trim panel 14 is absent in a cavity 78 defined between the mounting section 16b of the handle 16 and the pillar structure 20. In this embodiment, the base layer 68 is absent from the cavity 78 and extends substantially around the entire base of the handle 16.

Thus, as shown in FIG. 7, in response to deployment and inflation of the airbag 22, the force of the airbag 22 being inflated is sufficient to cause the trim panel 14 to be pulled from the cavity 78 between the mounting section 16b of the handle 16 and the pillar structure 20. In other words, since the base layer 68 is absent from the cavity 78 between the mounting portion 16b of the handle 16 and the pillar structure 20, the trim panel 14 is not pinched between the mounting section 16b of the handle 16 and the pillar structure 20. This structure enables the trim panel 14 to pivot or move away from the pillar structure 20 and facilitate deployment of the airbag 22. As can be understood, the handle 16 can remain attached to the pillar structure 20 and avoid restriction of deployment of the airbag 22 due to the limited space between the handle 16 and the pillar structure 20. This embodiment minimizes such a restriction.

Second Embodiment

Figure 8:
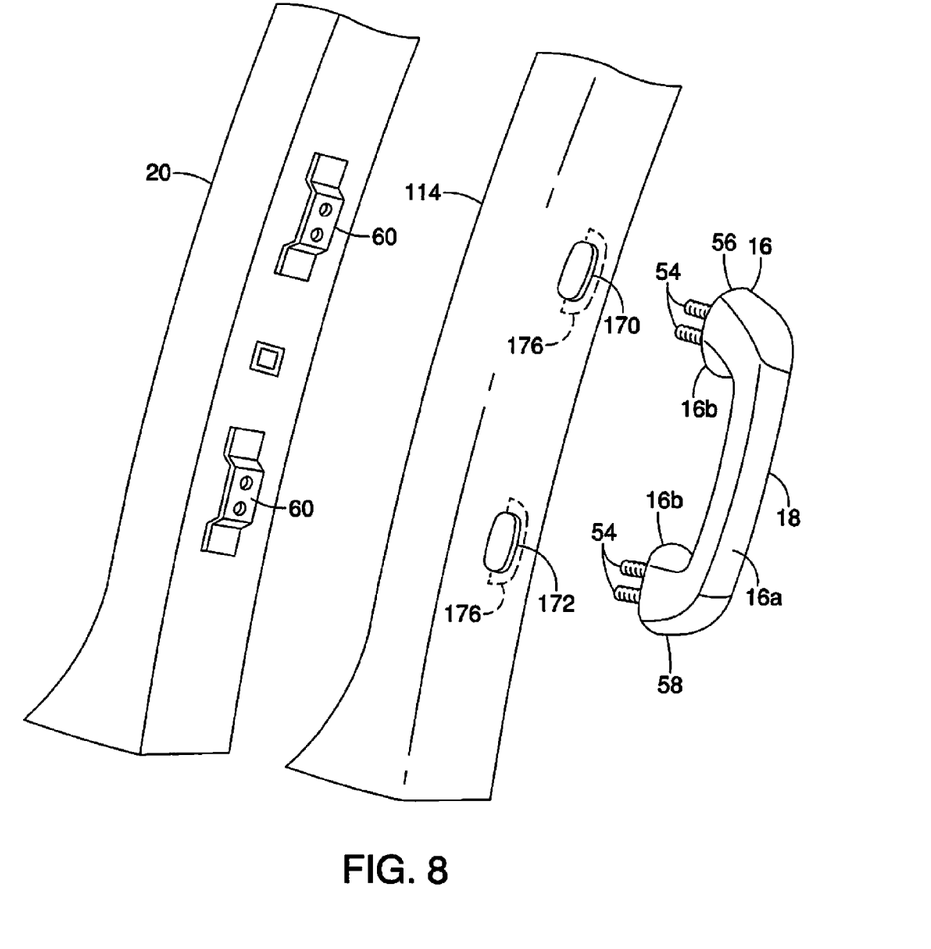
FIG. 8 is an exploded view of the vehicle interior according to a second embodiment of the present invention.
Figure 9:
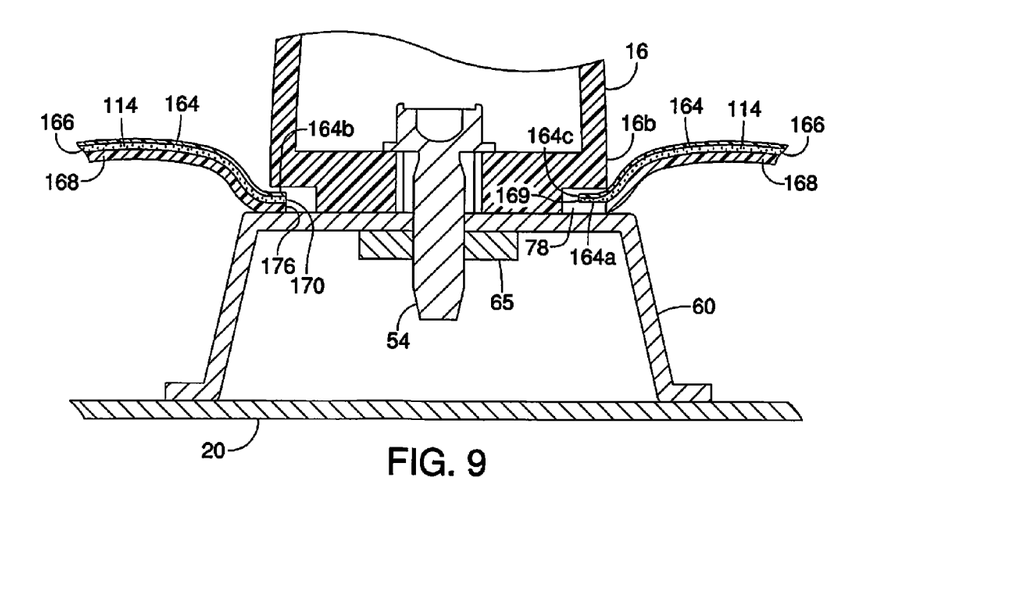
FIG. 9 is a cross sectional view of a vehicle interior shown in FIG. 8.
Figure 10:
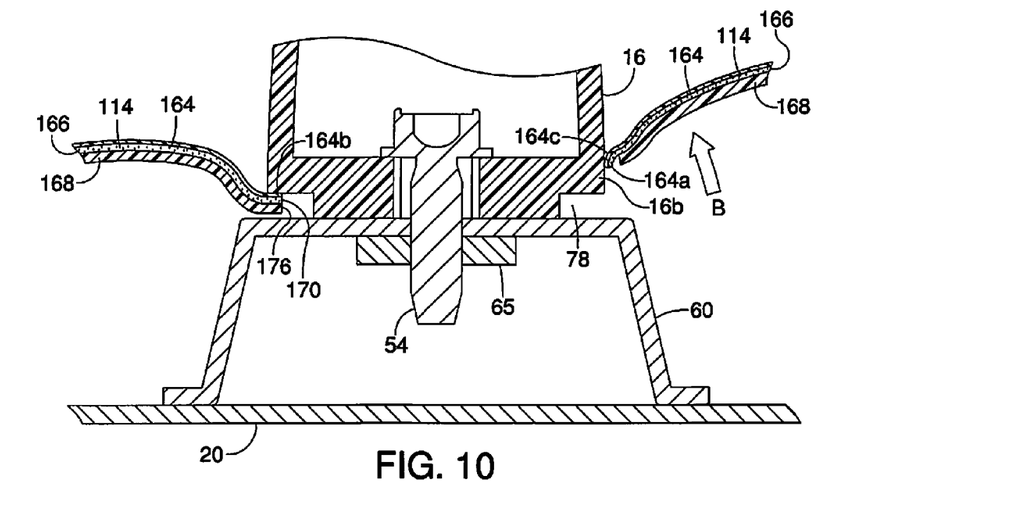
FIG. 10 is a cross sectional view of the vehicle interior shown in FIG. 8 with the supplemental restraint system deployed.

Referring now to FIGS. 8-10, a trim panel 114 in accordance with a second embodiment will now be explained. In view of the similarity between the first and second embodiments, the parts of the second embodiment that are identical to the parts of the first embodiment will be given the same reference numerals as the parts of the first embodiment.

As shown in this embodiment, the vehicle interior trim panel 114 includes a similar structure as the embodiment described above. That is, the trim panel 114 includes an external layer 164, a padding layer 166 and a base layer 168. In this embodiment, the base layer 168 is disposed between the external layer 164 and the pillar structure, while being spaced apart from the peripheral edge 164c of the first portion 164a of the external layer 164. In other words, the base layer 168 is absent along a portion (e.g., first portion 164a) of the external layer 164 between the pillar structure 20 and the handle 16. However, the base layer 168 is not absent along the entire portion of the external layer 164 between the pillar structure 20 and the handle 16. Accordingly, the base layer 168 is disposed between the pillar structure 20 and the handle 16 along or adjacent to at least some of the apertures 170 and 172 defined by the external layer 164 (e.g., second portion 164b). In other words, the base layer 168 defines a generally semi-circular opening 176 so as to enable the base layer 168 to be disposed between the external layer 164 and the pillar structure 20, without being disposed between the external layer 164 and the pillar structure 20 at the portion of the external layer 164 disposed between the pillar structure 20 and the handle 16.

Thus, as shown in FIG. 10, the trim panel 114 is configured and arranged such that in response to deployment of the airbag 22, the trim panel 114 moves in the direction of Arrow B such that the trim panel 114 effectively pivots. That is, the trim panel 114 pivots away from the pillar structure in the direction of arrows B to enable the air bag 22 to deploy. In this embodiment, only a portion of the trim panel 14 surrounding the base of the handle 16 easily moves away from the pillar structure 22 such that the external layer is no longer disposed in the cavity 78. In other words, only the portion of the trim panel 114 in which the base layer 168 is absent or partially absent from the cavity 78 easily moves in a direction away from the pillar structure 20. The pivoting movement of the trim panel 114 allows the airbag 22 to completely inflate and extend downward, covering most, if not all, of the window in the door 26, as is depicted in FIG. 2.

Thus, as shown in FIG. 10, in response to deployment and inflation of the airbag 22, the force of the airbag being inflated is sufficient to cause the trim panel 114 to be at least partially pulled from the cavity 78 between the mounting section 16b of the handle 16 and the pillar structure 20. In other words, since the base layer 168 is absent from a portion of the cavity 78 between the mounting portion 16b of the handle 16 and the pillar structure 20, the trim panel 114 is not pinched between the mounting section 16b of the handle 16 and the pillar structure 20. This structure enables the trim panel 114 to pivot or move away from the pillar structure 20 and facilitate deployment of the airbag 22. As can be understood, the handle 16 can remain attached to the pillar structure 20 and avoid restriction of deployment of the airbag 22 due to the limited space between the handle 16 and the pillar structure 20. This embodiment minimizes such a restriction.

Third Embodiment

Figure 11:
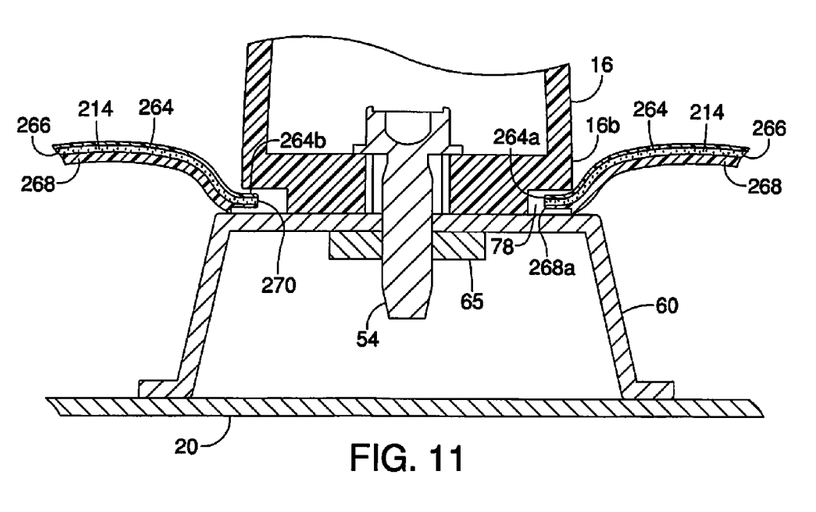
FIG. 11 is a cross sectional view of a vehicle interior according to a third embodiment of the present invention.

Referring now to FIG. 11, a trim panel in accordance with a third embodiment will now be explained. In view of the similarity between the first and third embodiments, the parts of the third embodiment that are identical to the parts of the first embodiment will be given the same reference numerals as the parts of the first embodiment.

As shown in this embodiment, the vehicle interior trim panel 214 includes a similar structure as the embodiment described above. That is, the trim panel 214 includes an external layer 264, a padding layer 266 and a base layer 268. The external layer 264 defines an aperture 270, and overlies the pillar structure 20. The external layer 264 has a portion 264a configured to be disposed in a space between the pillar structure 20 and the handle 16 attached to the pillar structure 20. The base layer 268 is disposed between the external layer 264 and the pillar structure 20 and has a reduced thickness portion 268a disposed between the external layer 264 and the pillar structure 20 at the portion (e.g., first portion 264a) of the external layer 264 disposed between the pillar structure 20 and the handle 16.

In this embodiment, the portion of the external layer 264 configured to be disposed between the pillar structure 20 and the handle 16 is one of a first portion 264a and a second portion 264b of the external layer 264, each of the first and second portions 264a and 264b of the external layer 264 being disposed between the pillar structure 20 and the handle 16 such that the external layer 264 is disposed between the pillar structure 20 and the handle 16 around an entire base of the handle 16. In other words, the reduced thickness portion 268a can be disposed between the first portion 264b of the external layer 264 and the pillar structure 20 and between the second portion 264b of external layer 264 and the pillar structure 20. However, if desired the reduced thickness layer is configured to be disposed only between the pillar structure and the second portion 264b or the first portion 264a of the external layer 264.

The pillar structure, dashboard, and handle are conventional components that are well known in the art. Since the pillar structure, dashboard, and handle are well known in the art, these structures are not discussed or illustrated in detail herein. Rather, it will be apparent to those skilled in the art from this disclosure that the components can be any type of structure that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle interior trim panel. Accordingly, these terms, as utilized to describe the present invention should be interpreted relative to a vehicle equipped with the vehicle interior trim panel.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle interior trim panel comprising:
   an external layer defining an aperture, and being configured to overlie a vehicle interior structure and having a portion configured to be disposed in an aperture between the vehicle interior structure and a handle attached to the vehicle interior structure; and
   a base layer configured to be disposed between the external layer and the vehicle interior structure, without being disposed between the external layer and the vehicle interior structure at the portion of the external layer disposed between the vehicle interior structure and the handle, the base layer including an a peripheral edge spaced from the aperture.

2. The vehicle interior trim panel according to claim 1, wherein
   the portion of the external layer configured to be disposed between the vehicle interior structure and the handle is one of a first portion and a second portion of the external layer, each of the first and second portions of the external layer being configured to be disposed between the vehicle interior structure and the handle such that the external layer is disposed between the vehicle interior structure and the handle around an entire base of the handle.

3. The vehicle interior trim panel according to claim 2, wherein
   the base layer is configured to be disposed between the external layer and the vehicle interior structure, without being disposed between the first portion of the external layer and the vehicle interior structure and between the second portion of external layer and the vehicle interior structure.

4. The vehicle interior trim panel according to claim 2, wherein
the base layer is configured to be disposed between the second portion of the external layer and the vehicle interior structure while being spaced apart from the peripheral edge of the first portion of the external layer.

5. The vehicle interior trim panel according to claim 4, further comprising
a padding layer is configured to be disposed between the base layer and the external layer.

6. The vehicle interior trim panel according to claim 5, wherein
the padding layer is configured to be disposed between the external layer and the vehicle interior structure at the portion of the external layer disposed between the vehicle interior structure and the handle.

7. The vehicle interior trim panel according to claim 1, wherein
the base layer is plastic.

8. The vehicle interior trim panel according to claim 1, wherein
the external layer is a cloth wrapping.

9. The vehicle interior trim panel according to claim 1, wherein
the base layer is configured to be disposed between the external layer and the vehicle interior structure, without being disposed between the vehicle interior structure and the handle.

10. The vehicle interior trim panel according to claim 1, wherein
the portion of the external layer configured to be disposed between the vehicle interior structure and the handle attached to the vehicle interior structure is about 10 mm.

11. The vehicle interior trim panel according to claim 1, wherein
the vehicle interior trim panel is configured to facilitate deployment of an airbag.

12. The vehicle interior trim panel according to claim 1, wherein
the base layer defines a generally circular opening so as to enable the base layer to be disposed between the external layer and the vehicle interior structure, without being disposed between the external layer and the vehicle interior structure at the portion of the external layer disposed between the vehicle interior structure and the handle.

13. The vehicle interior trim panel according to claim 1, wherein
the base layer defines a generally semi-circular opening so as to enable the base layer to be disposed between the external layer and the vehicle interior structure, without being disposed between the external layer and the vehicle interior structure at the portion of the external layer disposed between the vehicle interior structure and the handle.

14. The vehicle interior trim panel according to claim 1, wherein
the vehicle interior trim panel is configured to be flexible at the portion of the external layer configured to be disposed between the vehicle interior structure and the handle attached to the vehicle interior structure so as to facilitate deployment of an airbag.

15. A vehicle interior trim panel comprising:
an external layer defining an aperture, and being configured to overlie a vehicle interior structure and having a portion configured to be disposed in an aperture between the vehicle interior structure and a handle attached to the vehicle interior structure; and
a base layer configured to be disposed between the external layer and the vehicle interior structure, a reduced thickness portion being disposed between the external layer and the vehicle interior structure at the portion of the external layer disposed between the vehicle interior structure and the handle.

16. The vehicle interior trim panel according to claim 15, wherein
the portion of the external layer configured to be disposed between the vehicle interior structure and the handle is one of a first portion and a second portion of the external layer, each of the first and second portions of the external layer being configured to be disposed between the vehicle interior structure and the handle such that the external layer is disposed between the vehicle interior structure and the handle around an entire base of the handle.

17. The vehicle interior trim panel according to claim 16, wherein
the base layer is configured to be disposed between the external layer and the vehicle interior structure, and the reduced thickness portion is disposed between the first portion of the external layer and the vehicle interior structure and between the second portion of external layer and the vehicle interior structure.

18. The vehicle interior trim panel according to claim 16, wherein
the reduced thickness layer is configured to be disposed only between the second portion of the external layer and the vehicle interior structure.

19. A vehicle interior, comprising:
a pillar structure;
a handle coupled to the pillar structure, and including a handle mounting section with a lower mounting surface; and
a trim panel including an external layer and a base layer, the external layer defining an aperture, overlying the pillar structure and having a portion disposed between the lower mounting surface and the pillar structure, the base layer being disposed between the external layer and the pillar structure, without being disposed between the external layer and the pillar structure at the portion of the external layer disposed between the pillar structure and the handle, the base layer including a peripheral edge spaced from the aperture so as not to be pinched by the handle mounting section.

20. The vehicle interior according to claim 19, wherein
the lower mounting surface defines a recess between the handle and the pillar structure, and a peripheral edge of the base layer is spaced apart from the recess between the handle and the pillar structure.

* * * * *